United States Patent
Naidoo et al.

(10) Patent No.: US 6,594,228 B1
(45) Date of Patent: Jul. 15, 2003

(54) BACKUP PROCEDURE FOR SIGNALLING LINKS

(75) Inventors: Nilanthren V. Naidoo, Maple Ridge (CA); Vladimir Rakocevic, Vancouver (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/360,767

(22) Filed: Jul. 26, 1999

(30) Foreign Application Priority Data

Feb. 5, 1999 (CA) .............................................. 2261323

(51) Int. Cl.$^7$ ................................................ G06F 11/00
(52) U.S. Cl. ........................................ 370/217; 370/244
(58) Field of Search ................................ 370/216, 217, 370/242, 244, 450, 454, 522, 218, 237, 225, 398, 395.2, 221–222, 223–224, 230, 235, 247–253; 714/2, 4, 7; 709/239

(56) References Cited

U.S. PATENT DOCUMENTS 5,949,755 A * 9/1999 Uphadya et al. ............. 370/431
6,222,855 B1 * 4/2001 Kimber et al. ............... 370/463
6,311,288 B1 * 10/2001 Heeren et al. ............... 370/217

OTHER PUBLICATIONS

ISDN Primary Rate Interface Call Control Switching and Signalling Generic Requirements for Class II Equipment, Appendix B "D–channel Backup Procedure", pp. B1–B35, Bell Communications Research, Inc. TR–NWT–001268, Dec. 1991.*

* cited by examiner

Primary Examiner—Dang Ton
Assistant Examiner—Phuc Tran
(74) Attorney, Agent, or Firm—Oyen Wiggs Green & Mutala

(57) ABSTRACT

A method of improving the signalling performance reliability of an interface between a signalling agent and a network element. In the case of a non-redundant signalling agent, a primary link is established between a first Layer 2 port of the signalling agent and a first Layer 2 port of the network element; and, a primary backup link is established between a second Layer 2 port of the signalling agent and a second Layer 2 port of the network element. During normal operation of the primary link, the primary link is maintained in an active state in which all signalling messages directed to the interface are transferred between the Layer 3 segments over the primary link. The primary backup link is maintained in a standby state in which the primary backup link is active between the second set of Layer 2 ports, but inactive between the Layer 3 segments.

34 Claims, 6 Drawing Sheets

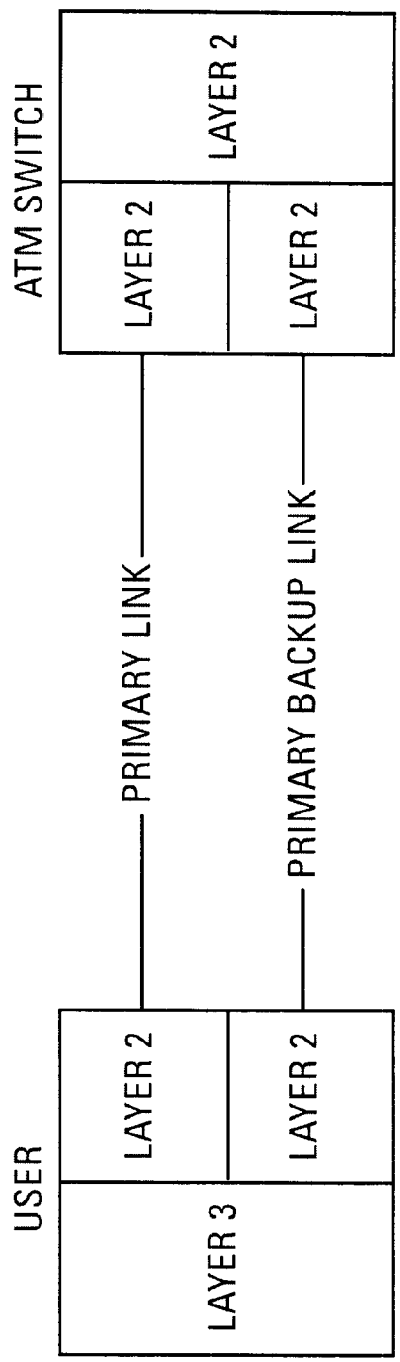

| TIMER | DEFAULT VALUE | STATE | CAUSE FOR START | CAUSE FOR NORMAL STOP | ACTION AT FIRST EXPIRY | IMPLEMENTATION |
|---|---|---|---|---|---|---|
| T321 | 4s | CONNECTING UP | SERVICE SENT | SERVICE ACK OR SERVICE RECEIVED | | MANDATORY |

FIG. 5

| TIMER | DEFAULT VALUE | STATE | CAUSE FOR START | CAUSE FOR NORMAL STOP | ACTION AT FIRST EXPIRY | IMPLEMENTATION |
|---|---|---|---|---|---|---|
| T WAIT | 10s | OOS | SAAL DISCONNECTION, AND BACKUP AVAILABLE | NO OTHER CONNECTION FOUND | SEND AAL-ESTABLISH REQUEST | MANDATORY |

FIG. 6

| 8 | 7 | 6 | 5 | 4 | 3 | 2 | 1 | OCTET |
|---|---|---|---|---|---|---|---|---|
| 0 | 0 | 0 | 0 | 0 | 0 | 0 | 1 | 1 |
| LINK STATUS INFORMATION ELEMENT IDENTIFIER ||||||||  |
| 1 | 0 | 0 | 0 | 0 | 0 | 0 | 1 | 2 |
| EXT | CODING STD. || FLAG | RES | IE ACTION IND. ||| |
| LENGTH OF LINK STAUS IE |||||||| 3 |
| LENGTH OF LINK STATUS IE (CONT) |||||||| 4 |
| 1 | 0 |  |  |  |  |  |  | 5 |
| EXT | RES | LINK ID ||| NEW STATUS ||| |

- LINK ID ( OCTET 5 )
BITS
6 5 4
0 0 0    PRIMARY LINK
0 0 1    PRIMARY BACKUP LINK
1 0 0    SECONDARY LINK
1 0 1    SECONDARY BACKUP LINK
ALL OTHER VALUES ARE RESERVED

- LINK STATUS ( OCTET 5 )
BITS
3 2 1
0 0 0    IS
0 0 1    STBY
0 1 0    CON
0 1 1    OOS
ALL OTHER VALUES ARE RESERVED

FIG. 7

BACKUP PROCEDURE FOR SIGNALLING LINKS

TECHNICAL FIELD

A backup procedure employing standby signalling links for improving signalling performance reliability of interfaces controlled by such links, particularly in a DSS2 asynchronous transfer mode network.

BACKGROUND

Conventional signalling protocols enable autonomous network elements, for example switching or router systems in a network and end-user systems attached to the network, to communicate via physical links therebetween in order to inter-operate. Implementation of a signalling protocol within the individual network elements is typically modelled as a stack of functional layers that pass messages between themselves. Each layer has a specific interface to the layers immediately above and below it, and each layer effects a particular purpose or function, the details of which are abstracted from the other layers. The lowest three layers of the protocol stack are: physical, data link and network; otherwise known as layers one (L1), two (L2) and three (L3), respectively.

The physical layer (L1) interfaces directly with a physical transmission medium. It provides for the transparent transmission of a digital data stream across the physical link between network elements. The intelligence managing the data stream and protocols residing above the physical layer are transparently conveyed by the physical layer.

The data link layer (L2) is primarily responsible for providing a reliable communications path across the physical layer on behalf of the network layer. Typically this entails that the link layer perform error detection and in some cases, error correction. The data link control functions at this layer establish a peer-to-peer relationship across each physical link between network elements.

The function of the network layer (L3) generally is to provide reliable, in sequence delivery of protocol data between higher layer (e.g., transport layer) entities. In order to do this, the network layer must have an end-to-end addressing capability. A unique network-layer (end-to-end) address is assigned to each network-layer capable network element, which may communicate with its peers over a route of intermediate elements through the network. In connection-oriented type networks, the network layer also provides call processing functionality. Digital subscriber signalling system no. 2 is a well known example of such a network layer protocol.

The digital subscriber signalling system no. 2 (DSS2) is an asynchronous transfer mode (ATM) protocol which specifies the procedures for establishing, maintaining and clearing of network connections at the user-network interface (UNI) of a broadband integrated service digital network (B-ISDN). The DSS2 signalling specification stipulated by the International Telecommunications Union, Telecommunications Standardization Sector (ITU-T) in *Broadband Integrated Services Digital Network (B-ISDN)—Digital Subscriber Signalling System No. 2 (DSS 2)—User—Network Interface (UNI) Layer 3 Specification For Basic Call/Connection Control*, ITU-T, Q.2931 (February 1995) does not provide any support for signalling link redundancy.

In non-associated signalling, a signalling link controls multiple interfaces. Failure of the interface carrying the signalling link will result in the tearing down of all calls controlled by the signalling link, even though the interfaces carrying the actual calls are still operational. When non-associated signalling is employed, the reliability of the signalling performance for the interfaces controlled by the signalling link may be unacceptable. The present invention improves such reliability by providing a backup procedure employing standby signalling links.

Proxy Signalling is an optional capability, as specified by the ATM Forum, in *ATM UNI Signalling Specification, Version 4.0*, af-sig-0061.000, which allows a user known as a proxy signalling agent (PSA), to perform signalling for one or more users that do not support signalling. A single PSA can control a large number of interfaces on different switches in the ATM network. The reliability of proxy signalling is improved by using a backup PSA. The present invention supports redundant PSAs when they operate in an active and standby fashion; that is, with only one of the PSAs active at any time to provide messages at ATM Layer 3 (i.e. the network layer).

SUMMARY OF INVENTION

The present invention applies to the interface between terminal or endpoint equipment and a communications network, such as an ATM network or other connection-based communications system. In an ATM-based embodiment, when non-associated signalling is used, the invention allows the peer DSS2 (Layer 3) signalling entities at the terminal equipment and ATM Switch to use two ATM Adaptation Layer Service Specific Sublayer (SAAL Layer 2, or datalink layer) connections, i.e. an active and a standby. When proxy signalling is used, the invention allows a redundant pair of PSAs operating in an active/standby fashion to control the same interfaces on an ATM switch using different DSS2 signalling links from each PSA, but terminating on one DSS2 link in the ATM switch. The invention thus enables the Layer 3 entity at the ATM Switch to use up to four Layer 2 connections, i.e. two connections to the active PSA and two connections to the standby PSA. In both cases, only one of the Layer 2 connections is active at any time to carry signalling messages.

The invention provides a method of improving the signalling performance reliability of an interface between two signalling agents and a network element (such as an ATM switch in a DSS2 asynchronous transfer mode network). In the case of a non-redundant signalling agent, a Layer 2 connection (the "primary link") is established between a first Layer 2 port of the signalling agent and a first Layer 2 port of the network element; and, a Layer 2 connection (the "primary backup link") is established between a second Layer 2 port of the signalling agent and a second Layer 2 port of the network element. The Layer 2 ports are coupled to Layer 3 segments of the signalling agent and the network element respectively, in accordance with established network communication protocols.

During normal operation of the signalling link, the primary link is maintained in an active state in which all signalling messages directed to the interface are transferred between the Layer 3 segments over the primary link. The primary backup link is maintained in a standby state, such that it is active between the second set of Layer 2 ports, but inactive between the Layer 3 segments.

Upon abnormal operation of the primary link, the primary link is temporarily switched into an inactive state to prevent further transfer over the primary link of signalling messages directed to the interface; and, the primary backup link is switched into an active state in which all signalling messages directed to the interface are transferred between the Layer 3 segments over the primary backup link.

In the case of redundant primary and secondary proxy signalling agents, a Layer 2 connection (the "primary link") is established between a first Layer 2 port of the primary signalling agent and a first Layer 2 port of the network element; a Layer 2 connection (the "primary backup link") is established between a second Layer 2 port of the primary signalling agent and a second Layer 2 port of the network element; a Layer 2 connection (the "secondary link") is established between a first Layer 2 port of the secondary signalling agent and a third Layer 2 port of the network element; and, a Layer 2 connection (the "secondary backup link") is established between a second Layer 2 port of the secondary signalling agent and a fourth Layer 2 port of the network element. The Layer 2 ports are coupled to Layer 3 segments of the signalling agents and the network element respectively, in accordance with established network communication protocols.

During normal operation the primary signalling agent is active, and the primary link is maintained in an active state in which all signalling messages directed to the interface are transferred between the Layer 3 segments over the primary link. The primary backup link is maintained in a standby state in which the primary backup link is active between the primary signalling agent second Layer 2 port and the network element second Layer 2 port, but inactive between the Layer 3 segments. Similarly, the secondary link is maintained in a standby state in which the secondary link is active between the secondary signalling agent first Layer 2 port and the network element third Layer 2 port but inactive between the Layer 3 segments; and, the secondary backup link is maintained in a standby state in which the secondary backup link is active between the secondary signalling agent second Layer 2 port and the network element fourth Layer 2 port but inactive between the Layer 3 segments.

Upon abnormal operation of the primary link and during normal operation of the Layer 2 connections to the secondary signalling agents, the primary link is temporarily switched into an inactive state to prevent further transfer over the primary link of signalling messages directed to the interface; and the primary backup link is switched into an active state in which all signalling messages directed to the interface are transferred between the Layer 3 segments over the primary backup link. The secondary link and the secondary backup link are maintained in their respective standby states.

Upon abnormal operation of the primary signalling agent, and during normal operation of the Layer 2 connections to the secondary signalling agents, the links to the primary agent are temporarily switched into an inactive state to prevent further transfer over the primary link of signalling messages directed to the interface; and the secondary link is switched into an active state in which all signalling messages directed to the interface are transferred between the Layer 3 segments over the secondary link. The secondary backup link is maintained in a standby state.

In another embodiment, the invention provides a method of improving the signalling performance reliability of an interface between a signalling agent and a network element. A Layer 2 primary link is established between a first Layer 2 port of the signalling agent and a first Layer 2 port of the network element. The signalling agent first Layer 2 port is further coupled to a Layer 3 segment of the signalling agent, and the network element first Layer 2 port is further coupled to a Layer 3 segment of the network element. A Layer 2 primary backup link is established between a second Layer 2 port of the signalling agent and a second Layer 2 port of the network element. The signalling agent second Layer 2 port is further coupled to the Layer 3 segment of the signalling agent, and the network element second Layer 2 port is further coupled to the Layer 3 segment of the network element. During normal operation of the primary link, the primary link is maintained in an active state in which all signalling messages directed to the interface are transferred between the Layer 3 segments over the primary link; with the primary backup link being maintained in a standby state in which the primary backup link is active between the second Layer 2 ports but inactive between the Layer 3 segments. Upon abnormal operation of the primary link, the primary link is maintained in an inactive state to prevent further transfer over the primary link of signalling messages directed to the interface; and, the primary backup link is maintained in an active state in which all signalling messages directed to the interface are transferred between the Layer 3 segments over the primary backup link.

In another embodiment, the invention provides a method of improving the signalling performance reliability of an interface between first and second network elements. A Layer 2 primary link is established between a first Layer 2 port of the first network element and a first Layer 2 port of the second network element. The first network element first Layer 2 port is further coupled to a Layer 3 segment of the first network element and the second network element first Layer 2 port is further coupled to a Layer 3 segment of the second network element. A Layer 2 primary backup link is established between a second Layer 2 port of the first network element and a second Layer 2 port of the second network element. The first network element second Layer 2 port is further coupled to the Layer 3 segment of the first network element, and the second network element second Layer 2 port is further coupled to the Layer 3 segment of the second network element. During normal operation of the primary link, the primary link is maintained in an active state in which all signalling messages directed to the interface are transferred between the Layer 3 segments over the primary link; and, the primary backup link is maintained in a standby state in which the primary backup link is active between the second Layer 2 ports but inactive between the Layer 3 segments. Upon abnormal operation of the primary link, the primary link is maintained in an inactive state to prevent further transfer over the primary link of signalling messages directed to the interface; and, the primary backup link is maintained in an active state in which all signalling messages directed to the interface are transferred between the Layer 3 segments over the primary backup link.

In another embodiment, the invention provides a method of improving the signalling performance reliability of an interface between a first signalling agent, a second signalling agent and a network element. A primary link is established between a first Layer 2 port of the first signalling agent and a first Layer 2 port of the network element. The first signalling agent first Layer 2 port is further coupled to a Layer 3 segment of the first signalling agent, and the network element first Layer 2 port is further coupled to a Layer 3 segment of the network element. A secondary link is established between a first Layer 2 port of the second signalling agent and a second Layer 2 port of the network element. The second signalling agent first Layer 2 port is further coupled to a Layer 3 segment of the second signalling agent, and the network element second Layer 2 port is further coupled to the Layer 3 segment of the network element. During normal operation of the first signalling agent the primary link is maintained in an active state in which all signalling messages directed to the interface are transferred between the Layer 3 segments over the primary link; and, the secondary link is maintained in a standby state in which the secondary link is active between the second signalling agent first Layer 2 port and the network element second Layer 2 port but inactive between the Layer 3 segments. Upon abnormal operation of the first signalling agent and during normal operation of the second signalling agent the primary link is maintained in an inactive state to prevent further transfer over the primary link of signalling messages directed to the interface; and, the secondary link is maintained in an active state in which all signalling messages directed to the interface are transferred between the Layer 3 segments over the secondary link.

In another embodiment, the invention provides a method of improving the signalling performance reliability of an interface between a signalling agent and a connection-based communications system. A datalink layer primary link is established between a first datalink layer port of the signalling agent and a first datalink layer port of the communications systems. The signalling agent first datalink layer port is further coupled to a network layer segment of the signalling agent, and the communications system first datalink layer port is further coupled to a network layer segment of the communications system. A datalink layer primary backup link is established between a second datalink layer port of the signalling agent and a second datalink layer port of the communications system. The signalling agent second datalink layer port is further coupled to the network layer segment of the signalling agent, and the communications system second datalink layer port is further coupled to the network layer segment of the communications system. During normal operation of the primary link the primary link is maintained in an active state in which all signalling messages directed to the interface are transferred between the network layer segments over the primary link; and, the primary backup link is maintained in a standby state in which the primary backup link is active between the second datalink layer ports but inactive between the network layer segments. Upon abnormal operation of the primary link, the primary link is maintained in an inactive state to prevent further transfer over the primary link of signalling messages directed to the interface; and, the primary backup link is maintained in an active state in which all signalling messages directed to the interface are transferred between the network layer segments over the primary backup link.

In another embodiment, the invention provides a method of improving the signalling performance reliability of an interface between a first signalling agent, a second signalling agent and a connection-based communications system. A primary link is established between a first datalink layer port of the first signalling agent and a first datalink layer port of the communications system. The first signalling agent first datalink layer port is further coupled to a network layer segment of the first signalling agent, and the communications system first datalink layer port is further coupled to a network layer segment of the communications system. A secondary link is established between a first datalink layer port of the second signalling agent and a second datalink layer port of the communications system. The second signalling agent first datalink layer port is further coupled to a network layer segment of the second signalling agent, and the communications system second datalink layer port is further coupled to the network layer segment of the communications system. During normal operation of the first signalling agent the primary link is maintained in an active state in which all signalling messages directed to the interface are transferred between the network layer segments over the primary link; and, the secondary link is maintained in a standby state in which the secondary link is active between the second signalling agent first datalink layer port and the communications system second datalink layer port but inactive between the network layer segments. Upon abnormal operation of the first signalling agent and during normal operation of the second signalling agent, the primary link is maintained in an inactive state to prevent further transfer over the primary link of signalling messages directed to the interface; and, the secondary link is maintained in an active state in which all signalling messages directed to the interface are transferred between the network layer segments over the secondary link.

BRIEF DESCRIPTION OF DRAWINGS

FIG. 4 depicts an architecture for implementing a backup procedure with a non-redundant signalling agent, in accordance with the invention.

FIG. 5 is a table particularizing the Layer 3 timer T321 used in the preferred embodiment.

FIG. 6 is a table particularizing the Layer 2 connection timer TWait used in the preferred embodiment.

FIG. 7 particularizes the link status information element is used to convey the desired status of a Layer 2 connection.

DESCRIPTION

Introductory Overview

The invention solves two problems, as previously indicated. The first problem is to improve the reliability of signalling links when one signalling link is used to control multiple interfaces on a network element, for example, a switch or router. The second problem is to allow a redundant pair of Proxy Signalling Agents, which are operating in an active/standby fashion, to control the same interfaces on the network element using different signalling links from each PSA, but terminating on one signalling link in the network element.

The first problem is solved by using two link layer or Layer 2 connections between peer network layer or Layer 3 entities. While both connections may be active at Layer 2, only one of the Layer 2 connections can be used at any one time to carry signalling messages between the peer Layer 3 entities. Initially one connection is made active for use by Layer 3, and when that connection fails a switch-over protocol is used to bring the other connection into service. Layer 3 continues to use this connection even after the first connection is reconnected at Layer 2. Thus, a switch-over only occurs when a failure occurs on the Layer 2 connection that is used by the Layer 3 entity. The second problem is solved by connecting the Layer 2 connections from each PSA to a single Layer 3 entity on the network element, for instance an ATM switch, and defining a procedure for switching between the connections. Since only one PSA can be active at any one time, only the Layer 2 connection to the active PSA can be used to carry signalling messages for Layer 3. This solution also supports the use of backup Layer 2 connections from each PSA to the ATM Switch.

Figure 1:
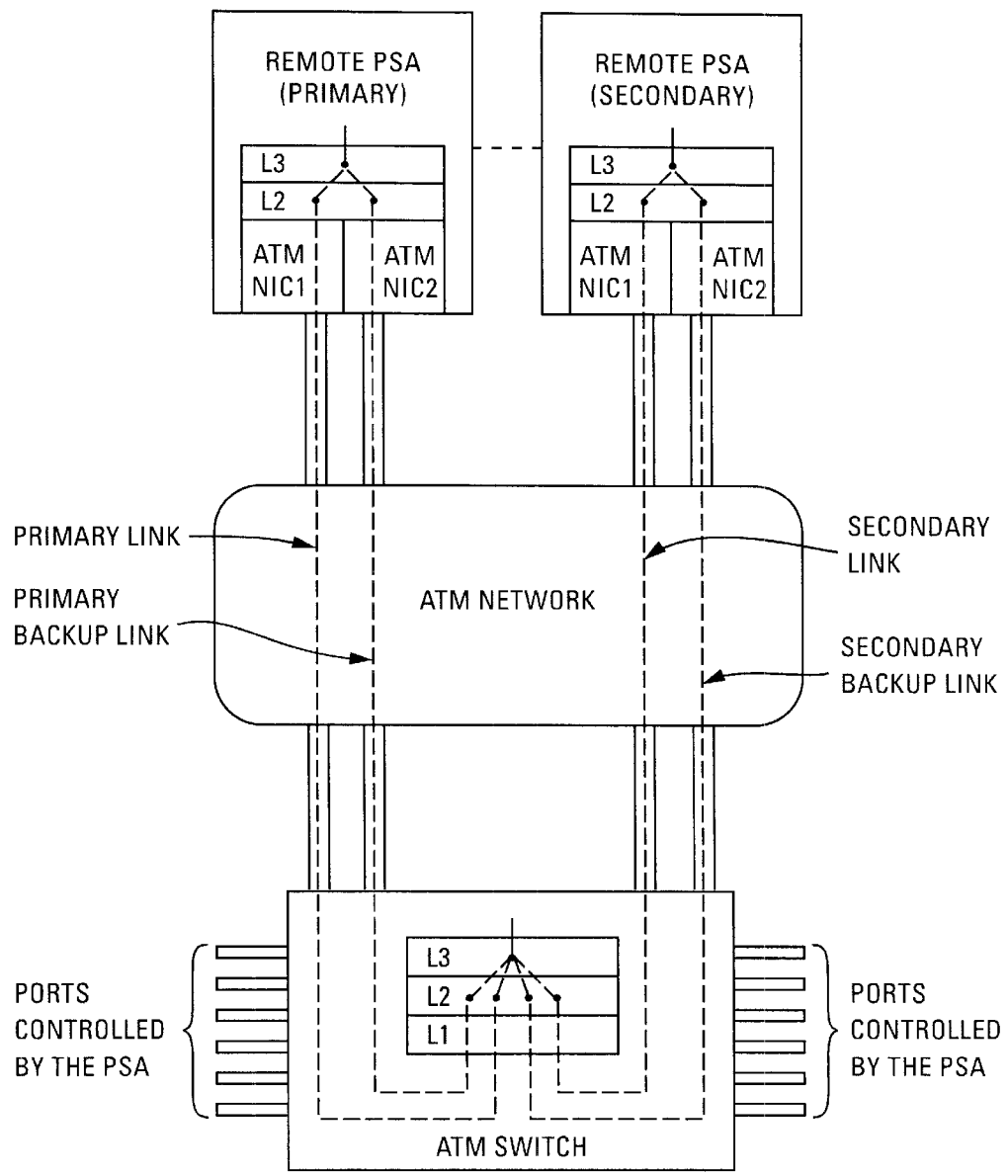
FIG. 1 depicts a pair of redundant proxy signalling agents, both having backup links in accordance with the invention.

FIG. 1 shows an example of proxy signalling using a backup procedure in accordance with the invention. In this example, a redundant pair of "proxy signalling agents" (PSA) operate in an active and standby fashion. Only one of the PSAs is active at any given time. The active PSA controls one or more ports on the ATM switch. In the event of a failure of the active PSA, the other PSA becomes active and takes over the control of the ports, as hereinafter explained. Throughout the take over process, all stable calls on these ports are maintained.

Figure 2:
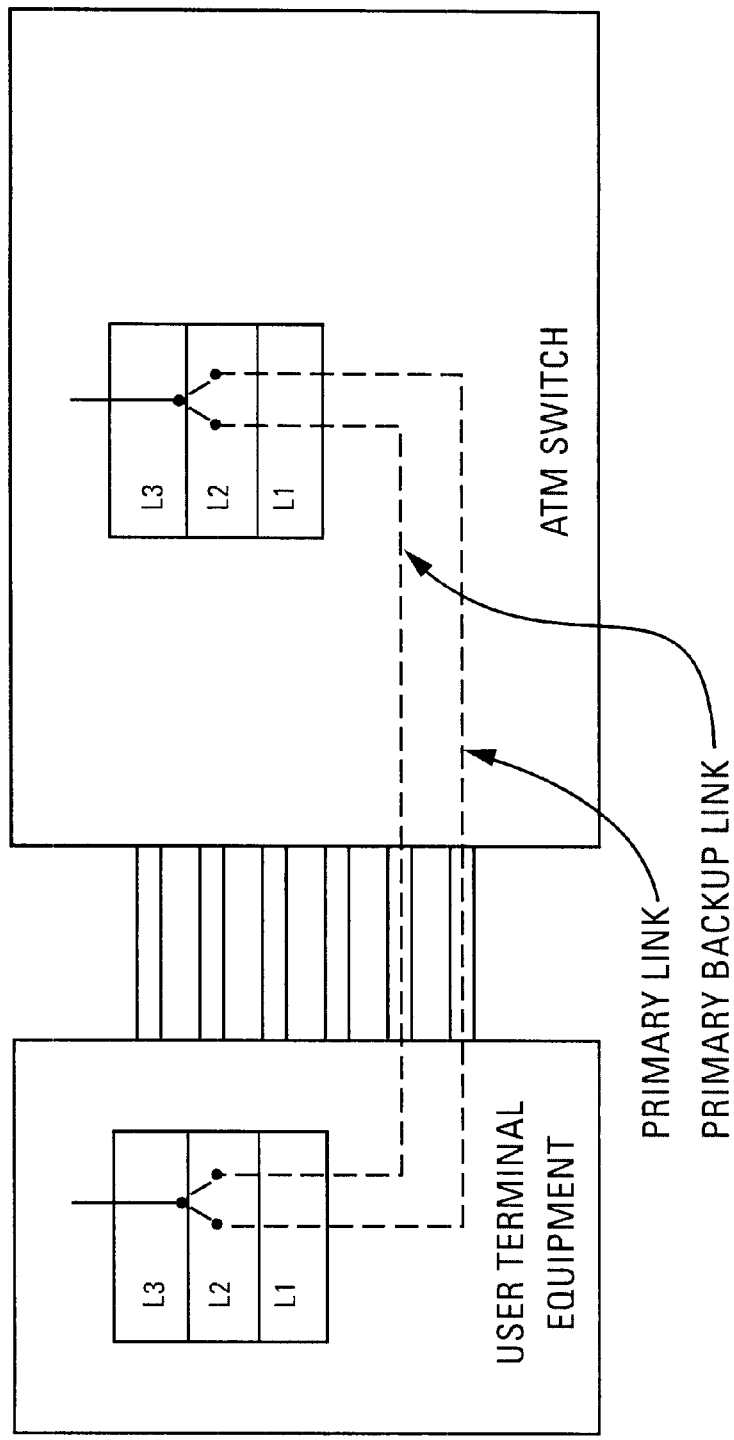
FIG. 2 provides an example of non-associated signalling with a backup link in accordance with the invention.

FIG. 2 depicts an example of the backup procedure of the present invention as applied to non-associated signalling. In this example, the User Terminal Equipment has one or more facilities to the ATM switch which are controlled by a single Layer 3 (L3) signalling entity. The Layer 3 entity has two Layer 2 (L2) connections created on two physically separate facilities. Signalling messages are sent over one Layer 2 connection (the "primary link") and the other (the "primary backup link") acts as a standby. When the active Layer 2 connection fails, the standby is made active.

Figure 3:
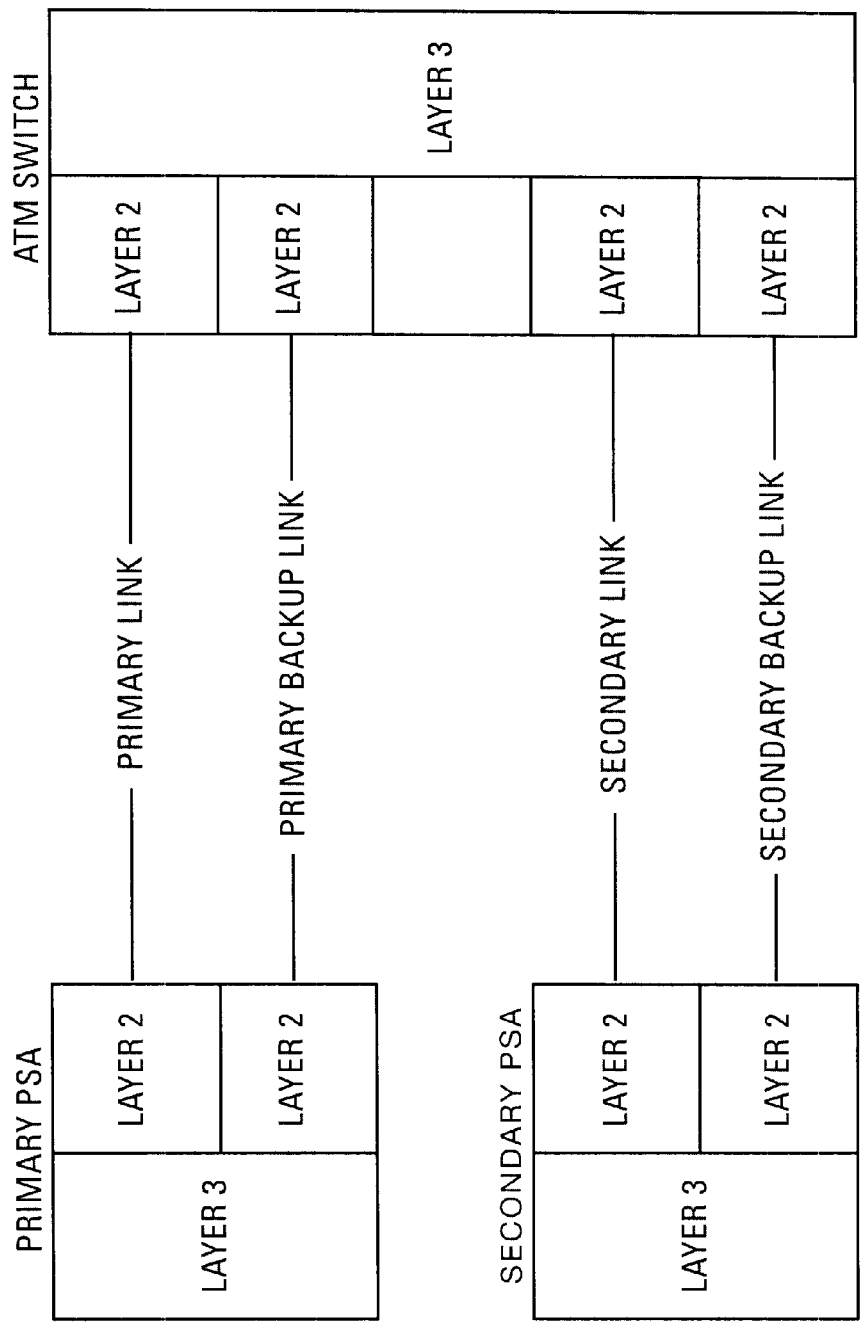
FIG. 3 depicts an architecture for implementing a backup procedure with redundant proxy signalling agents, in accordance with the invention.

FIG. 3 depicts the architecture of the backup procedure when redundant proxy signalling agents are used to control one or more ports on an ATM Switch. The primary PSA is the agent that is designated to be active when the system is first initialized. The secondary PSA (if present) assumes a standby role when the system is first initialized. A redundant pair of Layer 2 connections is supported from each agent. The Layer 2 connections to the primary PSA are provisioned as the primary and primary backup links, and the Layer 2 connections to the secondary PSA are provisioned as the secondary and secondary backup links. The backup links to each PSA are optional. If these backup links are used, they increase reliability and reduce the need to switch between agents when a link fails, since the process of switching between agents is more disruptive than switching between links to the same agent. This backup procedure requires that the PSA redundancy procedure keep the Layer 3 entity in the standby PSA synchronized with the Layer 3 entity in the active PSA.

FIG. 4 depicts the architecture of the backup procedure when non-redundant signalling agents are used. In this case, only the primary and primary backup links are required.

1 Role of Each Layer 2 Connection
1.1 Primary Link

This Layer 2 connection is provisioned between the ATM switch and the user terminal equipment or primary PSA. When only the primary link is configured for the Layer 3 entity at the ATM switch or user terminal equipment, the Layer 3 entity is functionally equivalent to a signalling link as defined by the ITU-T in the aforementioned Q.2931 publication. This allows the same Layer 3 entity to operate with peer Layer 3 entities that do not support this procedure. The primary link is always present.

1.2 Primary Backup Link

This Layer 2 connection is provisioned between the ATM switch and the primary PSA, and serves as a backup for the primary link. It is used when a failure is detected on the primary link. The protocol used to switch between the primary and primary backup links is described below.

1.3 Secondary Link

This Layer 2 connection is provisioned between the ATM switch and the secondary PSA. It is used only when the secondary PSA becomes active. The protocol used to switch between the primary and secondary links is described below.

1.4 Secondary Backup Link

This Layer 2 connection is provisioned between the ATM switch and the secondary PSA, and serves as a backup for the secondary link. The protocol used to switch between the secondary and secondary backup links is described below.

1.5 Link Designations and Priorities

The designations as primary link, primary backup link, secondary link and secondary backup link are agreed upon at subscription time by both sides of the interface. All connections are functionally equivalent in providing signalling for an ATM Layer 3 entity and only one of the connections is active at any given time to carry signalling messages for the Layer 3 entity. The order in which a Layer 2 connection is selected to provide signalling messages to Layer 3 on initiation or when all connections are out of service is: primary link, primary backup link, secondary link and secondary backup link respectively. That is, the primary link has the highest priority and the secondary backup link has the lowest priority with respect to link selection.

2 Link States
2.1 Layer 2 Connections States

Each Layer 2 connection is an assured mode signalling ATM adaptation layer (AAL) connection established between the peer Layer 2 entities. Each Layer 2 connection may be in one of the following states with respect to its Layer 3 entity:

2.1.1 In Service (IS)

A Layer 2 connection is in the IS state when it is active at Layer 2 and is being used to carry Layer 3 signalling messages. Only one of the Layer 2 connections that serve a particular Layer 3 entity can be in the IS state at any one time. The IS state is an invalid state for a Layer 2 connection connected to a standby PSA.

2.1.2 Standby (STBY)

A Layer 2 connection is in the STBY state when it is active at Layer 2 but is not being used to carry Layer 3 signalling messages.

2.1.3 Connecting (CON)

A Layer 2 connection is in the CON state when it is inactive at Layer 2 and is periodically requested by Layer 3 to establish the connection. The connection is placed in the STBY state either when an AAL_ESTABLISH-confirm or when an AAL_ESTABLISH-indication primitive is received from Layer 2, as hereinafter explained.

2.1.4 Out-of-Service (OOS)

A Layer 2 connection is in the OOS state when it is inactive at Layer 2. While in the OOS state, the response to an invitation to a connection establishment is met with the transmission of an AAL_RELEASE-request, as hereinafter explained. The OOS state is entered when the connection is administratively disabled or when it is placed in this state by Layer 3 to eliminate it as candidate for the active link. If the connection enters the OOS state after being administratively disabled, then it is placed in the OOS state only after it is administratively enabled. When the connection is placed in the OOS state by the switch-over procedure, a timer (TWait) is started for the connection, as hereinafter explained. On expiry of TWait, the connection is placed in the CON state.

2.2 Layer 3 States

Each Layer 3 entity in the ATM switch, user terminal equipment or PSA is in one of the following states at any one time:

2.2.1 Up

A Layer 3 entity is in the Up state if it is administratively enabled and one of its Layer 2 connections is in the IS state. A Layer 3 entity can only exchange messages with its peer entity when it is in the Up state. This state is invalid for a Layer 3 entity in the standby PSA, since it cannot bring any of its connections to the IS state.

2.2.2 Connecting

A Layer 3 entity is in the Connecting state if it is administratively enabled and in the process of bringing up one of its Layer 2 connections to the IS state. The Layer 3 entity is placed in the Up state when one of its Layer 2 connections enters the IS state. When a Layer 3 entity is placed in the Connecting state it places all of its administratively enabled Layer 2 connections in the CON state. A Layer 3 entity in the standby PSA must not try to bring any of its connections to the IS state, but must immediately be placed in the Standby state when one of its connections is placed in the STBY state.

2.2.3 Standby

A Layer 3 entity is in the Standby state if it is administratively enabled; if none of its Layer 2 connections are in the IS state, and if at least one of its Layer 2 connections is in the STBY state. This state is only valid for a Layer 3 entity in the standby PSA.

2.2.4 Down

A Layer 3 entity set is in the Down state if it is administratively disabled, or if it is administratively enabled and all of its Layer 2 connections are in the OOS state. When a Layer 3 entity is administratively disabled, all of its Layer 2 connections will be administratively disabled and hence placed in the OOS state.

3 Protocol Descriptions at Layer 2 and Layer 3

When a Layer 3 entity on the ATM Switch or user terminal equipment is configured with only a primary link, then the procedures for establishing and releasing of the signalling AAL connection are applied in accordance with the aforementioned ITU-T, Q.2931 DSS2 Signalling Specification. The switch-over between the primary link and primary backup link, or between the secondary link and secondary backup link can be initiated by either signalling entity and uses the same procedure. The switch-over between the primary and secondary links can only be initiated by the signalling entity in the PSA. As explained below, the switch-over protocol uses SERVICE and SERVICE ACKNOWLEDGE messages to bring the STBY link into the IS condition, and to avoid any possible deadlock condition. The messages are sent as parameter data of the AAL_UNITDATA primitive. The format and coding of the messages is described below. These messages can only be sent or received when the Layer 2 connection is in the STBY or IS state. Receipt of these messages in any other state is ignored.

3.1 Initialization

At the time of service turn-up, or after an outage of all Layer 2 connections; a Layer 3 entity in the ATM switch and user terminal equipment brings up the primary link first. More particularly, the Layer 3 entity in the active PSA brings up the primary link first if it is the primary PSA, and brings up the secondary link first if it is the secondary PSA. At this stage, all Layer 2 connections are in the CON state. A Layer 3 entity uses the following procedure to bring a Layer 2 connection to the IS state. This procedure is not used by a Layer 3 entity in the standby PSA. The standby PSA does not attempt to bring any of its connections to the IS state, but brings its connections to the STBY state only.

To illustrate the foregoing, let L1 and L2 be any two Layer 2 connections that are used by the Layer 3 entity such that L1≠L2. L1 and L2 are connections from the set {primary link, primary backup link, secondary link, secondary backup link} for the Layer 3 entity in the ATM switch; L1 and L2 are connections from the set {primary link, primary backup} for the user terminal equipment and primary PSA; and, L1 and L2 are connections from the set {secondary link, secondary backup link} for the secondary PSA.

The first connection (L1) to go to the STBY state results in all connections that have a lower priority than L1 being placed in the OOS state, and their TWait timers are started. For example, if L1=primary backup, then the secondary and secondary backup links are placed in the OOS state, but the state of the primary link is unchanged since it has a higher priority than the primary backup link. A SERVICE message indicating L1=IS (abbreviated SERV(L1=IS)) is sent on L1, timer T321 is started and one of the following events occur. During the interval that T321 is enabled, all Layer 3 messages are discarded.

1. T321 expires. All connections are placed in the CON state and the procedure for initialization applies.
2. Another connection (L2) that has a higher priority than L1 enters the STBY state. L1 is placed in the OOS state and its TWait timer is started. T321 is stopped. A SERV(L2=IS) message is sent on L2 and timer T321 is re-started.
3. Receipt of a SERV ACK(L1=IS) on L1. This event causes T321 to be stopped and L1 to be placed in the IS state. L1 is declared to be the active link and can be used to send and receive Layer 3 messages. The Layer 3 restart procedure is invoked by the Layer 3 entity.
4. Receipt of a SERV(L1=IS) message on L1. This event causes a SERV ACK (L1=IS) message to be sent on L1, T321 to be stopped and L1 to be placed in the IS state. L1 is declared to be the active link and can be used to send and receive Layer 3 messages. The Layer 3 restart procedure is invoked by the Layer 3 entity.
5. Receipt of a SERV ACK(L1=STBY) message on L1. This means that the signalling entity on the far end is in Standby (ie. the PSA on the other end of L1 is inactive). Therefore, if L1 is either the primary link or the primary backup link, then both primary link and primary backup link are placed in the OOS states, and their TWait timers are started. The secondary link and the secondary backup link are placed in the CON state.

T321 is stopped. This message is received only by the Layer 3 entity on the ATM switch.

When only the primary link is provisioned on the ATM switch and user terminal equipment, the SERVICE messages are not sent on the connection and the connection goes from the OOS state to the IS state when the connection is established to the far end. This also applies to the primary PSA when the secondary PSA does not exist.

3.2 Verification of an Active Layer 2 Connection

The Layer 3 entity uses the SERVICE and SERVICE ACKNOWLEDGE messages to verify the status of the link once it is active at Layer 2. The SERVICE ACKNOWLEDGE message optionally includes the status of all other Layer 2 connections provisioned at the remote Layer 3 entity.

3.2.1 Link in the IS State

When a SERV(L1=IS) message is received on the Layer 2 connection with L1 in the IS state, then no switch-over occurs. A SERV ACK(L1=IS) is sent to the far end to acknowledge the active status of L1. The state of L1 and other Layer 2 connections remains unchanged.

3.2.2 Link in the STBY State

When a SERV(L1=STBY) message is received on the Layer 2 connection L1 in the STBY state, then no switch-over occurs. A SERV ACK(L1=STBY) message is sent to the far end to acknowledge the status of L1. The state of L1 and other Layer 2 connections remains unchanged.

3.3 Switch-Over Procedure

3.3.1 Declaring a Connection Failure

During normal operation, a connection active at Layer 2 (i.e. in the IS or STBY state) is declared as failed when an AAL_RELEASE-indication primitive is received from Layer 2. A failed connection in the IS state is placed in the OOS state, and a failed connection in the STBY state is placed in the CON state, as determined by the switch-over procedure. A failed connection in the STBY state is placed in the CON state. When the connection is administratively disabled, an AAL_RELEASE-request primitive is sent on the connection and it is placed in the OOS state.

3.3.2 Initiating a Switch-Over between Active and Backup Connections

This procedure applies between the Layer 2 connections that are connected to the same two Layer 3 entities (e.g. the primary link and primary backup link, or secondary link and secondary backup link), and when one of the Layer 2 entities is in the IS state. Either side can initiate switch-over in this case. In the following discussion, L1 and L2 represent either the primary link and primary backup link; or, the secondary link and secondary backup link.

Assume that L2 is in the STBY state and L1 is in the IS state. If L1 is declared failed then it is placed in the OOS state, and its TWait timer is started. A SERV(L2=IS) message is sent on L2. Timer T321 is started and one of the following events occurs:

1. T321 expires. L1 and L2 are placed in CON state and the initialization procedure is applied.
2. Receipt of a SERV ACK(L2=IS) message on L2. This event causes T321 to be stopped and L2 to be placed in the IS state, thus allowing Layer 3 messages to be sent on L2. While T321 is enabled, all Layer 3 messages are discarded.
3. Receipt of a SERV(L2=IS) message on L2. This event causes a SERV ACK (L2=IS) message to be sent on L2, T321 to be stopped and L2 to be placed in the IS state, thus allowing Layer 3 messages to be sent on L2. While T321 is enabled, all Layer 3 messages are discarded.

Whenever a switch-over between active and backup connections occurs, the following procedures apply:

1. for calls in the clearing phase, no action is taken;
2. calls in the establishment phase are maintained, and optionally the status enquiry procedure may be invoked;
3. calls in the active state are maintained, and the status enquiry procedure described in §5.6.11 of the aforementioned ITU-T, Q.2931 publication is invoked.

3.3.3 Initiating a Switch-Over between Primary and Secondary Connections

The following procedure applies when a switch-over occurs between the primary and secondary connections, i.e. when a PSA switch-over occurs. In this case only the PSA can initiate the switch-over. In the following discussion, L1 represents a Layer 2 connection to the active PSA, and L2 represents a Layer 2 connection to the standby PSA.

If the Layer 3 entity on the ATM switch receives a SERV (L2=IS) message on L2, a SERV ACK(L2=STBY) message is sent on L2 to indicate that a connection L1 exists in the IS state. The SERV ACK message includes the link status of all Layer 2 connections provisioned for the Layer 3 entity on the switch.

If L1 is declared failed on the ATM switch and no other connections to the active PSA exist, but a connection L2 to the standby PSA exists and is in the STBY state; then L1 is placed in the CON state. All calls not in the active state are cleared locally. Timer T309 (described in the aforementioned ITU-T, Q.2931 publication) is started and one of the following events occurs:

1. T309 expires. All calls to the remote user are cleared with cause No. 27, "destination out of order". The initialization procedure is then applied.
2. L1 enters the STBY state. A SERV (L1=IS) message is sent on L1, and T321 is started. One of the following events then occurs:
   a. T321 expires. L1 is then placed in the CON state.
   b. Receipt of a SERV ACK(L1=IS) message on L1. This causes T321 to be stopped and L1 to be placed in the IS state.
   c. Receipt of a SERV(L1=IS) message on L1. This causes a SERV ACK (L1=IS) message to be sent on L1, T321 to be stopped and L1 to be placed in the IS state.
   d. Receipt of a SERV(L2=IS) message on L2. This causes a SERV ACK (L2=STBY) message to be sent on L2.
3. Receipt of a SERV(L2=IS) message on L2 while T321 is not running. This causes a SERV ACK (L2=IS) message to be sent on L2, and L2 to be placed in the IS state, thus allowing layer 3 messages to be sent on L2.

If either L1 or L2 is placed in the IS state before T309 expires, T309 is stopped. All calls in the active state are maintained, and the status enquiry procedure described in §5.6.11 of the aforementioned ITU-T, Q.2931 publication is invoked for each call.

The ATM switch assumes that the primary and secondary PSAs communicate through some external mechanism to determine who should assume the roles of active and standby agents. The PSAs can use the link status passed back in the SERV ACK messages to determine which PSA has the "better" view of the network.

3.3.4 Signalling Connection Release

When a signalling connection goes out of the IS state and none of the other connections of the Layer 3 entity are in the STBY state, the Layer 3 entity enters the Connecting state and the following procedure is applied:

1. any calls not in the active state are cleared locally;
2. if there is at least one call in the active state controlled by the signalling link, then timer T309 is started. If timer T309 is already running, it is not restarted.

If any connection enters the STBY or IS state, the following procedure is applied:

1. timer T309 is stopped; and,
2. the status enquiry procedure described in §5.6.11 of the aforementioned ITU-T, Q.2931 publication is performed for each call.

If T309 expires prior to any connection going to the STBY or IS state, then the call to the remote user is cleared with cause No. 27, "destination out of order".

3.3.5 Parameters and Timers

3.3.5.1 Layer 3 Timers

FIG. 5 is a table which particularizes the Layer 3 timer T321 used in the preferred embodiment, as explained above.

3.3.5.2 Layer 2 Connection Timers

FIG. 6 is a table which particularizes the Layer 2 connection timer TWait used in the preferred embodiment, as explained above.

4 Messages and Information Element Coding

4.1 Messages

Messages are sent using the AAL_UNITDATA primitive as described in ITU-T, *B-ISDN Signalling ATM Adaptation Layer—Service Specific Coordination Function for Support of Signalling at the User Network Interface (SSCF at UNI)*, ITU-T, Q.2130 (July 1994).

4.1.1 SERVICE Message

The SERVICE message has the format shown in the following table:

| Message Type: SERVICE |
| Significance: Local |
| Direction: Both |

| Information Element | Reference (infra) | Type | Length |
| --- | --- | --- | --- |
| Protocol Discriminator | 4.2.1 | M | 1 |
| Call Reference | 4.2.2 | M (note 1) | 4 |
| Message Type | 4.2.3 | M | 2 |
| Message Length | 4.2.4 | M | 2 |
| Link Status | 4.2.6 | M (note 2) | 5 |

Notes: 1 This message is sent with the global call reference defined in §4.3 of the aforementioned Q.2931 publication.
2 This message contains the desired state of the link when used during initialization and link switch-over procedures. Contains the present state of the link when used during the link verification procedure.

4.1.2 SERVICE ACKNOWLEDGE Message

The SERVICE ACKNOWLEDGE message has the format shown in the following table:

| Message Type: SERVICE ACKNOWLEDGE |
| Significance: Local |
| Direction: Both |

| Information Element | Reference (infra) | Type | Length |
| --- | --- | --- | --- |
| Protocol Discriminator | 4.2.1 | M | 1 |
| Call Reference | 4.2.2 | M (note 1) | 4 |
| Message Type | 4.2.3 | M | 2 |
| Message Length | 4.2.4 | M | 2 |
| Link Status | 4.2.6 | M (note 2) | 5 |

Notes: 1 This message is sent with the global call reference defined in §4.3 of the aforementioned Q.2931 publication.
2 The first instance of this information element is mandatory and indicates the status of the link which is used to send this message. Subsequent instances of this information element optionally indicate the link status of the other links that are provisioned for the Layer 3 entity. This information element may appear a maximum of four times in this message, i.e. once for each of the four possible link types.

4.2 General Message Format and Information Element Coding

4.2.1 Protocol Discriminator

The purpose of the protocol discriminator is to distinguish the messages defined for the backup procedure from other messages that may be sent on the AAL_UNITDATA primitive. The protocol discriminator is the first octet of every message and has the binary value "0100 0011".

4.2.2 Call Reference

The call reference is the second part of every message. The format of the call reference is defined in §4.3 of the aforementioned Q.2931 publication.

4.2.3 Message Type

The message type identifies the function of the message being sent. The message type is the third part of every message and has the format defined in §4.4.1 of the aforementioned Q.2931 publication. Octet 1 of the message type has the value "00001111" for the SERVICE message, and the value "00000111" for the SERVICE ACKNOWLEDGE message. The Flag field of octet 2 is set to "0", and the message action indicator field is set to "01".

4.2.4 Message Length

The message length identifies the length of the contents of the message. The message length is the fourth part of every message and its coding follows the rules prescribed in §4.4.2 of the aforementioned Q.2931 publication.

4.2.5 Variable Length Information Elements

The variable length information elements follow the coding rules prescribed in §4.5 of the aforementioned Q.2931 publication.

4.2.6 Link Status Information Element

The link status information element used to convey the desired status of a Layer 2 connection is shown in FIG. 7.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of improving the signalling performance reliability of an interface between a signalling agent and a network element, the method comprising:

(a) establishing a Layer 2 primary link between a first Layer 2 port of said signalling agent and a first Layer 2 port of said network element, said signalling agent first Layer 2 port being further coupled to a Layer 3 segment of said signalling agent and said network element first Layer 2port being further coupled to a Layer 3 segment of said network element;

(b) establishing a Layer 2 primary backup link between a second Layer 2 port of said signalling agent and a second Layer 2 port of said network element, said signalling agent second Layer 2 port being further coupled to said Layer 3 segment of said signalling agent and said network element second Layer 2 port being further coupled to said Layer 3 segment of said network element;

(c) during normal operation of said primary link:
      (i) maintaining said primary link in an active state in which all signalling messages directed to said interface are transferred between said Layer 3 segments over said primary link;
      (ii) maintaining said primary backup link in a standby state in which said primary backup link is active between said second Layer 2 ports but inactive between said Layer 3 segments;

(d) upon abnormal operation of said primary link:
      (i) maintaining said primary link in an inactive state to prevent further transfer over said primary link of signalling messages directed to said interface;
      (ii) sending a service message on the primary backup link;
      (iii) starting a timer;
      (iv) if one of a service message or service acknowledge message is received on said primary backup link before said timer reaches a predetermined time, maintaining said primary backup link in an active state in which all signalling messages directed to said interface are transferred between said Layer 3 segments over said primary backup link; and,
      (v) if neither a service message nor a service acknowledge message is received on said primary backup link before said timer reaches said predetermined time, returning to step (a), thereby preventing deadlock of said interface.

2. A method as defined in claim 1, further comprising, upon said abnormal operation of said primary link:

(i) monitoring said primary link to detect a return to normal operation of said primary link; and,
   (ii) upon detection of said return to normal operation of said primary link, maintaining said primary link in a standby state.

3. A method as defined in claim 2, further comprising, upon abnormal operation of said primary backup link, and after said primary link is in said standby state:

(i) maintaining said primary backup link in an inactive state to prevent further transfer over said primary backup link of signalling messages directed to said interface; and, (ii) maintaining said primary link in said active state.

4. A method as defined in claim 3, further comprising, upon said abnormal operation of said primary backup link:

(i) monitoring said primary backup link to detect a return to normal operation of said primary backup link; and, (ii) upon detection of said return to normal operation of said primary backup link, maintaining said primary backup link in a standby state.

5. A method as defined in claim 1, 2, 3 or 4, wherein said network element is an ATM switch in a DSS2 asynchronous transfer mode network.

6. A method of improving the signalling performance reliability of an interface between first and second network elements, the method comprising:

(a) establishing a Layer 2 primary link between a first Layer 2 port of said first network element and a first Layer 2 port of said second network element, said first network element first Layer 2 port being further coupled to a Layer 3 segment of said first network element and said second network element first Layer 2 port being further coupled to a Layer 3 segment of said second network element;

(b) establishing a Layer 2 primary backup link between a second Layer 2 port of said first network element and a second Layer 2 port of said second network element, said first network element second Layer 2 port being further coupled to said Layer 3 segment of said first network element and said second network element second Layer 2 port being further coupled to said Layer 3 segment of said second network element;

(c) during normal operation of said primary link:

(i) maintaining said primary link in an active state in which all signalling messages directed to said interface are transferred between said Layer 3 segments over said primary link;

(ii) maintaining said primary backup link in a standby state in which said primary backup link is active between said second Layer 2 ports but inactive between said Layer 3 segments;

(d) upon abnormal operation of said primary link:

(i) maintaining said primary link in an inactive state to prevent further transfer over said primary link of signalling messages directed to said interface;

(ii) sending a service message on the primary backup link;

(iii) starting a timer;

(iv) if one of a service message or service acknowledge message is received on said primary backup link before said timer reaches a predetermined time, maintaining said primary backup link in an active state in which all signalling messages directed to said interface are transferred between said Layer 3 segments over said primary backup link; and, (v) if one of a service message or a service acknowledge message is not received on said primary backup link before said timer reaches said predetermined time, returning to step (a), thereby preventing deadlock of said interface.

7. A method as defined in claim 6, further comprising, upon said abnormal operation of said primary link:

(i) monitoring said primary link to detect a return to normal operation of said primary link; and, (ii) upon detection of said return to normal operation of said primary link, maintaining said primary link in a standby state.

8. A method as defined in claim 7, further comprising, upon abnormal operation of said primary backup link, and after said primary link is in said standby state:

(i) maintaining said primary backup link in an inactive state to prevent further transfer over said primary backup link of signalling messages directed to said interface; and, (ii) maintaining said primary link in said active state.

9. A method as defined in claim 8, further comprising, upon said abnormal operation of said primary backup link:

(i) monitoring said primary backup link to detect a return to normal operation of said primary backup link; and, (ii) upon detection of said return to normal operation of said primary backup link, maintaining said primary backup link in a standby state.

10. A method as defined in claim 6, 7, 8 or 9, wherein said network element is an ATM switch in a DSS2 asynchronous transfer mode network.

11. A method of improving the signalling performance reliability of an interface between a first signalling agent, a second signalling agent and a network element, the method comprising:

(a) establishing a primary link between a first Layer 2 port of said first signalling agent and a first Layer 2 port of said network element, said first signalling agent first Layer 2 port being further coupled to a Layer 3 segment of said first signalling agent and said network element first Layer 2 port being further coupled to a Layer 3 segment of said network element;

(b) establishing a secondary link between a first Layer 2 port of said second signalling agent and a second Layer 2 port of said network element, said second signalling agent first Layer 2 port being further coupled to a Layer 3 segment of said second signalling agent and said network element second Layer 2 port being further coupled to said Layer 3 segment of said network element;

(c) during normal operation of said first signalling agent:

(i) maintaining said primary link in an active state in which all signalling messages directed to said interface are transferred between said Layer 3 segments over said primary link;

(ii) maintaining said secondary link in a standby state in which said secondary link is active between said second signalling agent first Layer 2 port and said network element second Layer 2 port but inactive between said Layer 3 segments;

(d) upon abnormal operation of said first signalling agent and during normal operation of said second signalling agent:

(i) maintaining said primary link in an inactive state to prevent further transfer over said primary link of signalling messages directed to said interface; and, (ii) maintaining said secondary link in an active state in which all signalling messages directed to said interface are transferred between said Layer 3 segments over said secondary link.

12. A method as defined in claim 11, further comprising:

(a) establishing a primary backup link between a second Layer 2 port of said first signalling agent and a third Layer 2 port of said network element, said first signalling agent second Layer 2 port being further coupled to said Layer 3 segment of said first signalling agent and said network element third Layer 2 port being further coupled to said Layer 3 segment of said network element;

(b) during said normal operation of said first signalling agent and during normal operation of said primary link, maintaining said primary backup link in a standby state in which said primary backup link is active between said first signalling agent second Layer 2 port and said network element third Layer 2 port but inactive between said Layer 3 segments;

(c) during said normal operation of said first signalling agent and upon abnormal operation of said primary link:

(i) maintaining said primary link in an inactive state to prevent further transfer over said primary link of signalling messages directed to said interface;

(ii) maintaining said primary backup link in an active state in which all signalling messages directed to said interface are transferred between said Layer 3 segments over said primary backup link; and, (d) upon said abnormal operation of said first signalling agent and during said normal operation of said second signalling agent and during normal operation of said secondary link, maintaining said primary backup link in an inactive state to prevent further transfer over said primary backup link of signalling messages directed to said interface.

13. A method as defined in claim 11, further comprising:

(a) establishing a secondary backup link between a second Layer 2 port of said second signalling agent and a fourth Layer 2 port of said network element, said second signalling agent second Layer 2 port being further coupled to said Layer 3 segment of said second signalling agent and said network element fourth Layer 2 port being further coupled to said Layer 3 segment of said network element;

(b) during said normal operation of said first signalling agent and during said normal operation of said primary link, maintaining said secondary backup link in a standby state in which said secondary backup link is active between said second signalling agent second Layer 2 port and said network element fourth Layer 2 port but inactive between said Layer 3 segments;

(c) upon said abnormal operation of said first signalling agent and during said normal operation of said second signalling agent and upon abnormal operation of said secondary link:

(i) maintaining said secondary link in an inactive state to prevent further transfer over said secondary link of signalling messages directed to said interface; and, (ii) maintaining said secondary backup link in an active state in which all signalling messages directed to said interface are transferred between said Layer 3 segments over said secondary backup link.

14. A method as defined in claim 11, further comprising:

(a) establishing a primary backup link between a second Layer 2 port of said first signalling agent and a third Layer 2 port of said network element, said first signalling agent second Layer 2 port being further coupled to said Layer 3 segment of said first signalling agent and said network element, third Layer 2 port being further coupled to said Layer 3 segment of said network element;

(b) establishing a secondary backup link between a second Layer 2 port of said second signalling agent and a fourth Layer 2 port of said network element, said second signalling agent second Layer 2 port being further coupled to said Layer 3 segment of said second signalling agent and said network element fourth Layer 2 port being further coupled to said Layer 3 segment of said network element;

(c) during said normal operation of said first signalling agent and during normal operation of said primary link:

(i) maintaining said primary backup link in a standby state in which said primary backup link is active between said first signalling agent second Layer 2 port and said network element third Layer 2 port but inactive between said Layer 3 segments;

(ii) maintaining said secondary backup link in a standby state in which said secondary backup link is active between said second signalling agent second Layer 2 port and said network element fourth Layer 2 port but inactive between said Layer 3 segments;

(d) during said normal operation of said first signalling agent and upon abnormal operation of said primary link:

(i) maintaining said primary link in an inactive state to prevent further transfer over said primary link of signalling messages directed to said interface;

(ii) maintaining said primary backup link in an active state in which all signalling messages directed to said interface are transferred between said Layer 3 segments over said primary backup link;

(e) upon said abnormal operation of said first signalling agent and during said normal operation of said second signalling agent and during normal operation of said secondary link:

(i) maintaining said primary backup link in an inactive state to prevent further transfer over said primary backup link of signalling messages directed to said interface;

(ii) maintaining said secondary backup link in said standby state;

(f) upon said abnormal operation of said first signalling agent and during said normal operation of said second signalling agent and upon abnormal operation of said secondary link:

(i) maintaining said secondary link in an inactive state to prevent further transfer over said secondary link of signalling messages directed to said interface; and, (ii) maintaining said secondary backup link in an active state in which all signalling messages directed to said interface are transferred between said Layer 3 segments over said secondary backup link.

15. A method as defined in claim 11, further comprising, upon said abnormal operation of said first signalling agent:

(i) monitoring said first signalling agent to detect a return to normal operation of said first signalling agent; and, (ii) upon detection of said return to normal operation of said first signalling agent, maintaining said primary link in a standby state.

16. A method as defined in claim 11, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link in a standby state.

17. A method as defined in claim 15, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link in a standby state.

18. A method as defined in claim 12, further comprising, upon said abnormal operation of said first signalling agent:

(i) monitoring said first signalling agent to detect a return to normal operation of said first signalling agent; and, (ii) upon detection of said return to normal operation of said first signalling agent, maintaining said primary link and said primary backup link in a standby state.

19. A method as defined in claim 12, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link in a standby state.

20. A method as defined in claim 18, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link in a standby state.

21. A method as defined in claim 13, further comprising, upon said abnormal operation of said first signalling agent:

(i) monitoring said first signalling agent to detect a return to normal operation of said first signalling agent; and, (ii) upon detection of said return to normal operation of said first signalling agent, maintaining said primary link in a standby state.

22. A method as defined in claim 13, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link and said secondary backup link in a standby state.

23. A method as defined in claim 21, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link and said secondary backup link in a standby state.

24. A method as defined in claim 14, further comprising, upon said abnormal operation of said first signalling agent:

(i) monitoring said first signalling agent to detect a return to normal operation of said first signalling agent; and, (ii) upon detection of said return to normal operation of said first signalling agent, maintaining said primary link and said primary backup link in a standby state.

25. A method as defined in claim 14, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link and said secondary backup link in a standby state.

26. A method as defined in claim 24, further comprising, upon said abnormal operation of said second signalling agent:

(i) monitoring said second signalling agent to detect a return to normal operation of said second signalling agent; and, (ii) upon detection of said return to normal operation of said second signalling agent, maintaining said secondary link and said secondary backup link in a standby state.

27. A method as defined in claim 11, 12, 13, 14, 15, 16, 17, 18, 19, 20, 21, 22, 23, 24, 25 or 26, wherein said network element is an ATM switch in a DSS2 asynchronous transfer mode network.

28. A method of improving the signalling performance reliability of an interface between a signalling agent and a connection-based communications system, the method comprising:

(a) establishing a datalink layer primary link between a first datalink layer port of said signalling agent and a first datalink layer port of said communications system, said signalling agent first datalink layer port being further coupled to a network layer segment of said signalling agent and said communications system first datalink layer port being further coupled to a network layer segment of said communications system;

(b) establishing a datalink layer primary backup link between a second datalink layer port of said signalling agent and a second datalink layer port of said communications system, said signalling agent second datalink layer port being further coupled to said network layer segment of said signalling agent and said communications system second datalink layer port being further coupled to said network layer segment of said communications system;

(c) during normal operation of said primary link:
(i) maintaining said primary link in an active state in which all signalling messages directed to said interface are transferred between said network layer segments over said primary link;
(ii) maintaining said primary backup link in a standby state in which said primary backup link is active between said second datalink layer ports but inactive between said network layer segments;

(d) upon abnormal operation of said primary link:
(i) maintaining said primary link in an inactive state to prevent further transfer over said primary link of signalling messages directed to said interface;
(ii) sending a service message on the primary backup link;
(iii) starting a timer;
(iv) if one of a service message or service acknowledge message is received on said primary backup link before said timer reaches a predetermined time, maintaining said primary backup link in an active state in which all signalling messages directed to said interface are transferred between said Layer 3 segments over said primary backup link; and, (v) if one of a service message or a service acknowledge message is not received on said primary backup link before said timer reaches said predetermined time, returning to step (a), thereby preventing deadlock of said interface.

29. A method of improving the signalling performance reliability of an interface between a first signalling agent, a second signalling agent and a connection-based communications system, the method comprising:

(a) establishing a primary link between a first datalink layer port of said first signalling agent and a first datalink layer port of said communications system, said first signalling agent first datalink layer port being further coupled to a network layer segment of said first signalling agent and said communications system first datalink layer port being further coupled to a network layer segment of said communications system;

(b) establishing a secondary link between a first datalink layer port of said second signalling agent and a second datalink layer port of said communications system, said second signalling agent first datalink layer port being further coupled to a network layer segment of said second signalling agent and said communications system second datalink layer port being further coupled to said network layer segment of said communications system;

(c) during normal operation of said first signalling agent:
  (i) maintaining said primary link in an active state in which all signalling messages directed to said interface are transferred between said network layer segments over said primary link;
  (ii) maintaining said secondary link in a standby state in which said secondary link is active between said second signalling agent first datalink layer port and said communications system second datalink layer port but inactive between said network layer segments;

(d) upon abnormal operation of said first signalling agent and during normal operation of said second signalling agent:
  (i) maintaining said primary link in an inactive state to prevent further transfer over said primary link of signalling messages directed to said interface; and,
  (ii) maintaining said secondary link in an active state in which all signalling messages directed to said interface are transferred between said network layer segments over said secondary link.

30. Apparatus for improving the signalling performance reliability of an interface between a signalling agent and a network element, said apparatus comprising:

(a) a Layer 2 primary link coupled between a first Layer 2 port of said signalling agent and a first Layer 2 port of said network element, said signalling agent first Layer 2 port being further coupled to a Layer 3 segment of said signalling agent and said network element first Layer 2 port being further coupled to a Layer 3 segment of said network element;

(b) a Layer 2 primary backup link coupled between a second Layer 2 port of signalling agent and a second Layer 2 port of said network element, said signalling agent second Layer 2 port being further coupled to said Layer 3 segment of said signalling agent and said network element second Layer 2 port being further coupled to said Layer 3 segment of said network element;

(c) means for selectably operating said primary link in one of:
  (i) an active state in which all signalling messages directed to said interface are transferred between said Layer 3 segments over said primary link;
  (ii) an inactive state in which further transfer over said primary link of signalling messages directed to said interface is prevented;

(d) means for selectably operating said primary backup link in one of:
  (i) a standby state in which said primary backup link is active between said second Layer 2 ports but inactive between said Layer 3 segments;
  (ii) an active state in which all signalling messages directed to said interface are transferred between said Layer 3 segments over said primary backup link;

(e) means for monitoring operation of said primary link to detect normal and abnormal operation of said primary link;

(f) means for responding to said detection of said normal operation of said primary link by:
  (i) actuating said means for selectably operating said primary link to maintain said primary link in said active state;
  (ii) actuating said means for selectably operating said primary backup link to maintain said primary backup link in said standby state;

(g) a timer;

(h) means for sending and receiving messages on said primary link and said primary backup link;

(i) means for initializing said interface;

(j) means for responding to said detection of said abnormal operation of said primary link by:
  (i) actuating said means for selectably operating said primary link to maintain said primary link in said inactive state;
  (ii) actuating said means for sending and receiving messages to send a service message on said primary backup link;
  (iii) starting said timer;
  (iv) if one of a service message or service acknowledge message is received on said primary backup link by said means for sending and receiving messages before said timer reaches a predetermined time, actuating said means for selectably operating said primary backup link to maintain said primary backup link in said active state; and,
  (v) if one of a service message or service acknowledge message is not received on said primary backup link by said means for sending and receiving messages before said timer reaches a predetermined time, actuating said means for initializing said interface, thereby preventing deadlock of said interface.

31. Apparatus for improving the signalling performance reliability of an interface between first and second network elements, said apparatus comprising:

(a) a Layer 2 primary link coupled between a first Layer 2 port of said first network element and a first Layer 2 port of said second network element, said first network element first Layer 2 port being further coupled to a Layer 3 segment of said first network element and said second network element first Layer 2 port being further coupled to a Layer 3 segment of said second network element;

(b) a Layer 2 primary backup link coupled between a second Layer 2 port of said first network element and a second Layer 2 port of said second network element, said first network element second Layer 2 port being further coupled to said Layer 3 segment of said first network element and said second network element second Layer 2 port being further coupled to said Layer 3 segment of said second network element;

(c) means for selectably operating said primary link in one of:
  (i) an active state in which all signalling messages directed to said interface are transferred between said Layer 3 segments over said primary link;
  (ii) an inactive state in which further transfer over said primary link of signalling messages directed to said interface is prevented;

(d) means for selectably operating said primary backup link in one of:
  (i) a standby state in which said primary backup link is active between said second Layer 2 ports but inactive between said Layer 3 segments;
  (ii) an active state in which all signalling messages directed to said interface are transferred between said Layer 3 segments over said primary backup link;

(e) means for monitoring operation of said primary link to detect normal and abnormal operation of said primary link;

(f) means for responding to said detection of said normal operation of said primary link by:
  (i) actuating said means for selectably operating said primary link to maintain said primary link in said active state;
  (ii) actuating said means for selectably operating said primary backup link to maintain said primary backup link in said standby state;

(g) a timer;

(h) means for sending and receiving messages on said primary link and said primary backup link;

(i) means for initializing said interface;

(j) means for responding to said detection of said abnormal operation of said primary link by:
  (i) actuating said means for selectably operating said primary link to maintain said primary link in said inactive state;
  (ii) actuating said means for sending and receiving messages to send a service message on said primary backup link;
  (iii) starting said timer;
  (iv) if one of a service message or service acknowledge message is received on said primary backup link by said means for sending and receiving messages before said timer reaches a predetermined time, actuating said means for selectably operating said primary backup link to maintain said primary backup link in said active state; and,
  (v) if one of a service message or service acknowledge message is not received on said primary backup link by said means for sending and receiving messages before said timer reaches a predetermined time, actuating said means for initializing said interface, thereby preventing deadlock of said interface.

32. Apparatus for improving the signalling performance reliability of an interface between a first signalling agent, a second signalling agent and a network element, said apparatus comprising:
(a) a primary link coupled between a first Layer 2 port of said first signalling agent and a first Layer 2 port of said network element, said first signalling agent first Layer 2 port being further coupled to a Layer 3 segment of said first signalling agent and said network element first Layer 2 port being further coupled to a Layer 3 segment of said network element;

(b) a secondary link coupled between a first Layer 2 port of said second signalling agent and a second Layer 2 port of said network element, said second signalling agent first Layer 2 port being further coupled to a Layer 3 segment of said second signalling agent and said network element second Layer 2 port being further coupled to said Layer 3 segment of said network element;

(c) means for selectably operating said primary link in one of:
  (i) an active state in which all signalling messages directed to said interface are transferred between said Layer 3 segments over said primary link;
  (ii) an inactive state in which further transfer over said primary link of signalling messages directed to said interface is prevented;

(d) means for selectably operating said secondary link in one of:
  (i) a standby state in which said secondary link is active between said second signalling agent first Layer 2 port and said network element second Layer port but inactive between said Layer 3 segments;
  (ii) an active state in which all signalling messages directed to said interface are transferred between said Layer 3 segments over said secondary link;

(e) means for monitoring operation of said first signalling agent to detect normal and abnormal operation of said first signalling agent;

(f) means for monitoring operation of said second signalling agent to detect normal and abnormal operation of said second signalling agent;

(g) means for responding to said detection of said normal operation of said first signalling agent by:
  (i) actuating said means for selectably operating said primary link to maintain said primary link in said active state;
  (ii) actuating said means for selectably operating said secondary link to maintain said secondary link in said standby state;

(h) means for responding to said detection of said abnormal operation of said first signalling agent and to said detection of said normal operation of said second signalling agent by:
  (i) actuating said means for selectably operating said primary link to maintain said primary link in said inactive state; and,
  (ii) actuating said means for selectably operating said secondary link to maintain said secondary link in said active state.

33. Apparatus for improving the signalling performance reliability of an interface between a signalling agent and a connection-based communications system, said apparatus comprising:
(a) a datalink layer primary link coupled between a first datalink layer port of said signalling agent and a first datalink layer port of said communications system, said signalling agent first datalink layer port being further coupled to a network layer segment of said signalling agent and said communications system first datalink layer port being further coupled to a network layer segment of said communications system;

(b) a datalink layer primary backup link coupled between a second datalink layer port of said signalling agent and a second datalink layer port of said communications system, said signalling agent second datalink layer port being further coupled to said network layer segment of said signalling agent and said communications system second datalink layer port being further coupled to said network layer segment of said communications system;

(c) means for selectably operating said primary link in one of:
  (i) an active state in which all signalling messages directed to said interface are transferred between said network layer segments over said primary link;
  (ii) an inactive state in which further transfer over said primary link of signalling messages directed to said interface is prevented;

(d) means for selectably operating said primary backup link in one of:
  (i) a standby state in which said primary backup link is active between said second datalink layer ports but inactive between said network layer segments;
  (ii) an active state in which all signalling messages directed to said interface are transferred between said network layer segments over said primary backup link;

(e) means for monitoring operation of said primary link to detect normal and abnormal operation of said primary link;

(f) means for responding to said detection of said normal operation of said primary link by:
  (i) actuating said means for selectably operating said primary link to maintain said primary link in said active state;
  (ii) actuating said means for selectably operating said primary backup link to maintain said primary backup link in said standby state;

(g) a timer;

(h) means for sending and receiving messages on said primary link and said primary backup link;

(i) means for initializing said interface;

(j) means for responding to said detection of said abnormal operation of said primary link by:
  (i) actuating said means for selectably operating said primary link to maintain said primary link in said inactive state;
  (ii) actuating said means for sending and receiving messages to send a service message on said primary backup link;
  (iii) starting said timer;
  (iv) if one of a service message or service acknowledge message is received on said primary backup link by said means for sending and receiving messages before said timer reaches a predetermined time, actuating said means for selectably operating said primary backup link to maintain said primary backup link in said active state; and,
  (v) if one of a service message or service acknowledge message is not received on said primary backup link by said means for sending and receiving messages before said timer reaches a predetermined time, actuating said means for initializing said interface, thereby preventing deadlock of said interface.

34. Apparatus for improving the signalling performance reliability of an interface between a first signalling agent, a second signalling agent and a connection-based communications system, said apparatus comprising:

(a) a primary link coupled between a first datalink layer port of said first signalling agent and a first datalink layer port of said communications system, said first signalling agent first datalink layer port being further coupled to a network layer segment of said first signalling agent and said communications system first datalink layer port being further coupled to a network layer segment of said communications system;

(b) a secondary link coupled between a first datalink layer port of said second signalling agent and a second datalink layer port of said communications system, said second signalling agent first datalink layer port being further coupled to a network layer segment of said second signalling agent and said communications system second datalink layer port being further coupled to said network layer segment of said communications system;

(c) means for selectably operating said primary link in one of:
  (i) an active state in which all signalling messages directed to said interface are transferred between said network layer segments over said primary link;
  (ii) an inactive state in which further transfer over said primary link of signalling messages directed to said interface is prevented;

(d) means for selectably operating said secondary link in one of:
  (i) a standby state in which said secondary link is active between said second signalling agent first datalink layer port and said communications system second datalink layer port but inactive between said network layer segments;
  (ii) an active state in which all signalling messages directed to said interface are transferred between said network layer segments over said secondary link;

(e) means for monitoring operation of said first signalling agent to detect normal and abnormal operation of said first signalling agent;

(f) means for monitoring operation of said second signalling agent to detect normal and abnormal operation of said second signalling agent;

(g) means for responding to said detection of said normal operation of said first signalling agent by:
  (i) actuating said means for selectably operating said primary link to maintain said primary link in said active state;
  (ii) actuating said means for selectably operating said secondary link to maintain said secondary link in said standby state;

(h) means for responding to said detection of said abnormal operation of said first signalling agent and to said detection of said normal operation of said second signalling agent by:
  (i) actuating said means for selectably operating said primary link to maintain said primary link in said inactive state; and,
  (ii) actuating said means for selectably operating said secondary link to maintain said secondary link in said active state.

* * * * *